Figure 1:
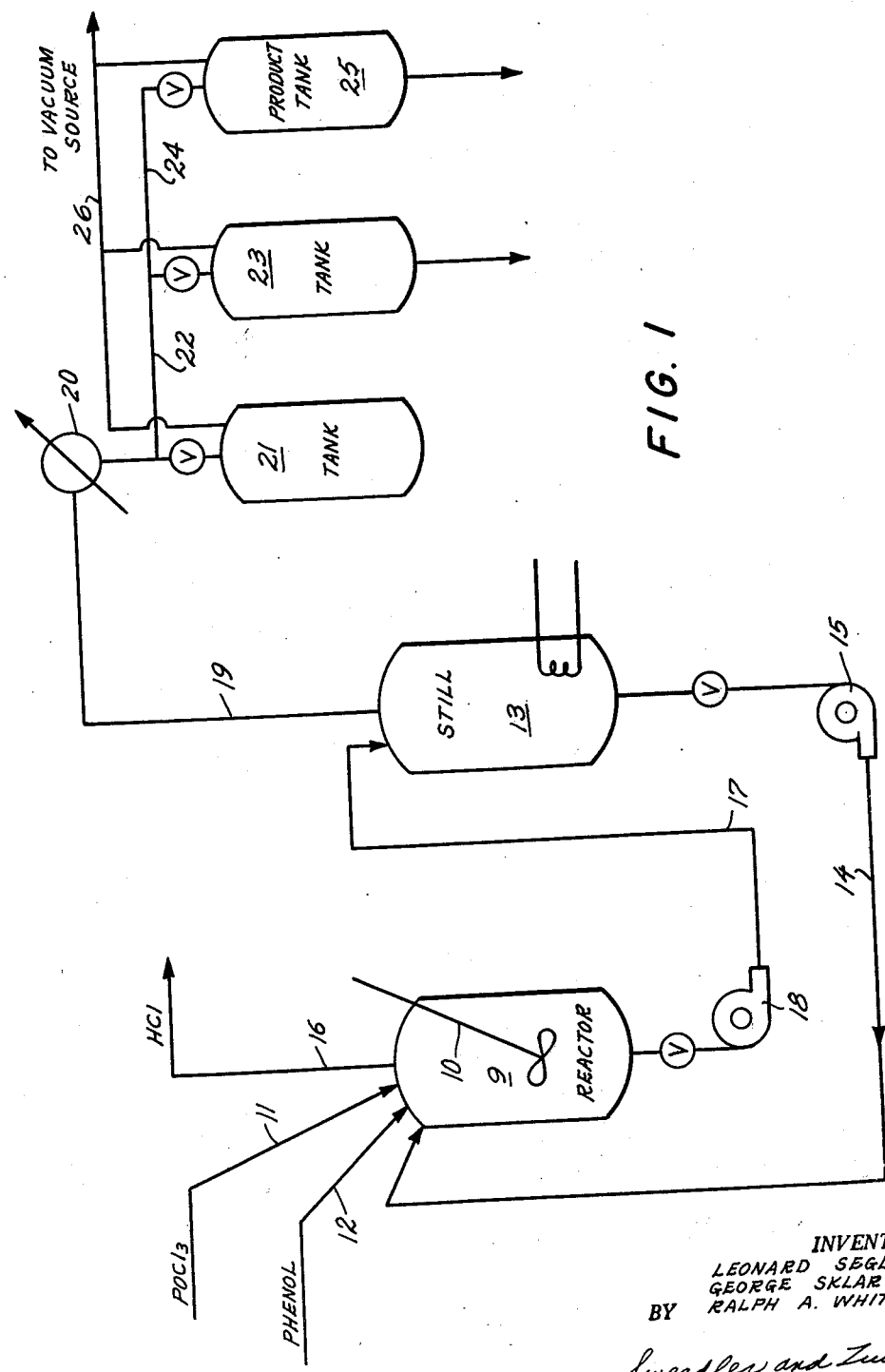

INVENTORS
LEONARD SEGLIN
GEORGE SKLAR
RALPH A. WHITE
BY
Sweedler and Zucker
ATTORNEYS

INVENTORS
LEONARD SEGLIN
GEORGE SKLAR
RALPH A. WHITE

United States Patent Office 3,077,491
Patented Feb. 12, 1963

3,077,491
PREPARATION OF TRIARYLPHOSPHATES
Leonard Seglin, White Plains, N.Y., and George Sklar, Charleston, and Ralph A. White, St. Albans, W. Va., assignors to FMC Corporation, a corporation of Delaware
Filed Oct. 26, 1959, Ser. No. 848,626
11 Claims. (Cl. 260—461)

This invention relates to the preparation of triarylphosphates, particularly tricresylphosphates, which are useful plasticizers, gasoline additives, functional fluids, etc.

In this specification all percentages are on a weight basis.

The production of triarylphosphates, as heretofore carried out, involves the reaction of phenols, including alkyl phenols, with phosphorus oxychloride in the presence of a catalyst such as aluminum chloride or magnesium chloride. After the reaction is completed, the excess phenol and the triarylphosphate are recovered by distillation and the residue discarded. This, of course, involves loss of reactants, reaction product, and catalyst in the residue with consequent reduction in yield and high operational expenses. Alternatively, it has been proposed to decompose and remove the catalyst prior to subjecting the reaction mixture to distillation or other purification technique. In this alternative procedure also the catalyst is lost. Moreover, in both such procedures, to obtain maximum recovery of triarylphosphate product, the distillation must be carried out at high temperatures and low pressures. Such high temperatures aggravate corrosion of the distillation equipment.

It is a principal object of the present invention to overcome or at least greatly minimize the above noted objectionable features of heretofore known procedures of producing triarylphosphates.

Another object of this invention is to provide such process which results in better yields.

Still another object of this invention is to provide such process which effects an economy in the cost of the catalyst required for the reaction.

Still another object of the present invention is to provide such process in which the recovery of the triarylphosphate by distillation of the reaction mixture can be carried out at lower end temperatures, thus minimizing still corrosion, and this without sacrifice to the yield or quality of the triarylphosphate.

In accordance with this invention phosphorus oxychloride is reacted with a phenol in the presence of the distillation residue produced by distilling (a) the product derived from a reaction mixture containing phosphorus oxychloride, such phenol and aluminum chloride, magnesium chloride, zinc chloride, or mixtures of such metal chlorides, or (b) the product derived from such reaction mixture in which instead of such metal chloride catalyst, such distillation residue is employed as the catalyst. The metal chloride need not be introduced as such into the reaction mixture; by introducing aluminum, magnesium or zinc in the form of the metal or metal oxide into the reaction mixture the metal chloride is formed by reaction with the phosphorus oxychloride.

Surprisingly we have found that the distillation residue of the reaction mixture produced by reacting a phenol with phosphorus oxychloride in the presence of the catalyst metal chloride (or in the presence of such distillation residue) is an efficient catalyst for the reaction and once the reaction has been started with a fresh catalyst, little or no additional fresh catalyst need be used, but the aforesaid distillation residue can be employed.

After such operation for an extended period of time, until the catalyst activity is reduced for any reason, it is only necessary to add to the recycled material, a small amount, say from 0.5% to 3% based on the phosphorus oxychloride feed, of fresh catalyst to restore the activity of the catalyst.

The phenol used is a hydroxybenzene such as phenol itself; cresols; xylenols; mixtures thereof including mixtures containing phenols and cresols, phenols and xylenols, cresols and xylenols, and all three of these phenols, particularly the so-called cresylic acid which is a mixture of various homologs and isomers of cresol, usually containing meta and para cresol, low boiling xylenols, and some phenols having ethyl substituents; m-butyl phenol; other alkyl phenols in which the alkyl groups each contain from 1 to 4 carbon atoms; and mixtures of such phenols. The phenol used should preferably be substantially anhydrous, i.e. contain less than 0.1% moisture.

The reaction is carried out employing an amount of the phenol which is at least equal to the stoichiometric amount required for reaction with the phosphorus oxychloride and desirably an excess of from 2% to 10% over and above this stoichiometric amount.

In commencing the operation, the amount of catalyst employed, i.e. the amount of fresh catalyst as distinguished from the recycle catalyst, is from 1% to 10%, preferably about 5%, based on the amount of phosphorus oxychloride. The preferred fresh catalyst is aluminum chloride having a particle size of from −4 to +20 mesh. The residue recycled from the distillation is introduced into the reactor in amount of from 1% to 65%, preferably about 30% to 35%, based on the feed of phenol to the reactor. This residue generally contains triarylphosphate and from 15% to 35% of active catalyst, which is a complex of the catalyst metal chloride with the phenol. The residue obtained after distilling off substantially all of the triarylphosphate can be used as the catalyst and recycled for this purpose, in which case its content of active catalyst will be greater than 15% to 35%. However, in view of the difficulty in handling such material, chiefly because of its solid character, it is preferred to carry out the distillation so as to leave in the residue from about 65% to 85%, preferably about 80% of triarylphosphate, thus producing a solution which can readily be recycled to the reactor.

The reaction is carried out at a temperature of from 40° to 130° C., preferably about 90° C. during the initial stages when the phenol, catalyst and phosphorus oxychloride are mixed. In batch operation, the reactor is first charged with the phenol and catalyst and the phosphorus oxychloride added while maintaining the reaction temperature at from 40° to 120° C., preferably about 90° C. Thereafter the reaction is completed at a higher temperature not exceeding about 200° C., desirably from 120° to 160° C. and preferably from 140° C. to 150° C. The completion of the reaction may require about 2 to 10 hours depending upon the temperature, the size of the batch, or the rate of flow of the reactants and reaction mixture, in the case of continuous operation.

The resultant reaction product is distilled under vacuum first removing unreacted phenol, then, if desired, an initial cut of triarylphosphate which desirably is recycled for admixture with the reaction product subjected to distillation, and thereafter the bulk of the triarylphosphate is taken off at from 2 to 10 mm. of mercury at a still pot temperature of from 220° to 300° C. (the lower still temperature being, of course, used at vacuums of the order of about 2 mm. of mercury and higher temperatures at vacuums of the order of 10 mm. of mercury). The residue from the last mentioned distillation contains from 65% to 85% of triarylphosphate and catalyst complex, which residue, as noted, is recycled to the reactor.

Since the residue is recycled, and thus any triarylphosphate contained therein is not lost, it is not necessary to use the higher temperatures required to obtain maximum recovery of triarylphosphate product; even though the distillation is stopped at an appreciably lower end point, the residual triarylphosphate in the residue is not lost but is recycled and eventually recovered as product.

Figure 2:
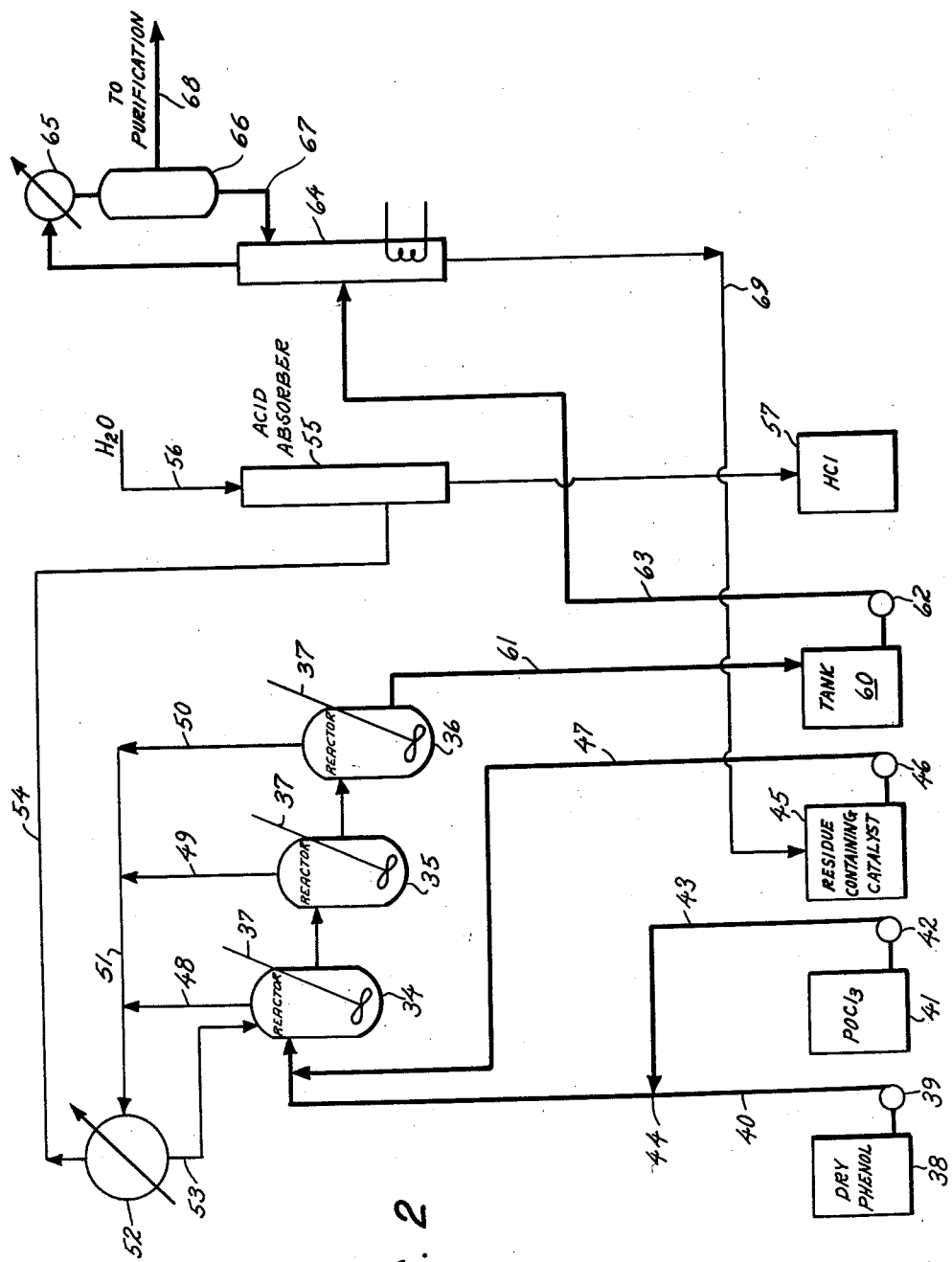

In the accompanying drawings, forming a part of this specification, FIGURE 1 exemplifies diagrammatically a preferred arrangement of equipment for practicing an embodiment of this invention involving batch operation;

FIGURE 2 exemplifies another embodiment of this invention involving continuous operation.

In FIGURE 1, 9 is the reactor equipped with an agitator 10. Reactor 9 is supplied with phosphorus oxychloride through line 11 and phenol through line 12. The residue including the catalyst complex removed as bottoms from vacuum still 13 is recycled to reactor 9 through valve controlled line 14 by pump 15. Reactor 9 is provided with an overhead line 16 through which passes the hydrogen chloride formed in the reaction; this line communicates with an acid absorber (not shown).

Still 13 is connected to reactor 9 through valve controlled line 17 through which the contents of the reactor 9 are pumped into still 13 by pump 18 when the reaction has gone to completion. Overhead line 19 leads from still 13 to a condenser 20 communicating with a receiving tank 21 for receiving the first cut. An intermediate cut, if removed, passes through line 22 into a tank 23 and the product cut passes through branch line 24 to the product receiver 25. The product may be further refined by distillation, alkali wash, treatment with carbon, etc. Tanks 21, 23 and 25 are provided with lines 26 communicating with a vacuum source.

In FIGURE 2, three reactors 34, 35 and 36 are shown but it will be understood that any desired number of such reactors may be employed, each provided with a suitable agitator 37. The reactor 34 is adapted to be charged with dry phenol from a storage tank 38 by pump 39 which pumps the dry phenol through line 40 leading into reactor 34.

Phosphorus oxychloride is pumped from storage tank 41 by pump 42 through line 43 which joins line 40 at 44. The residue containing catalyst is pumped from the storage tank 45 by pump 46 through line 47 into the reactor 34. The pumps 39, 42 and 46 pump streams of the phenol, phosphorus oxychloride and residue containing catalyst in the required proportions to produce a reaction mixture containing these constituents in the proportions hereinabove disclosed.

The reactors 34, 35 and 36 are provided with overhead lines 48, 49 and 50 which lead into a common line 51 communicating with condenser 52. This condenser is provided with a return line 53 for returning the condensate to reactor 34. The vapors are chiefly hydrogen chloride which are not condensed, but pass through a line 54 to the acid absorber 55 through which a stream of water flows. The water is introduced through line 56 and the resultant hydrochloric acid is charged into a storage tank 57.

The reactor 36 discharges into a reaction product tank 60 through line 61. From tank 60 the product is pumped by pump 62 through line 63 into a still 64 provided with a reflux condenser 65. The condensate produced in condenser 65 passes to a flow box 66 from which a portion returns as reflux through line 67 and the remainder passes to purification equipment through line 68.

The residue from still 64 is passed continuously to tank 45 through line 69.

It will be appreciated that flow through the reactors and associated equipment is continuous, the reactors 34, 35 and 36 being of such capacity as to give the necessary hold-up time (at the flow rates employed) for the reaction mixture to be maintained at the temperatures mentioned for a long enough period to permit the reaction to go to completion.

The following examples are given for the purpose of illustrating preferred modes of practicing the invention; it will be understood the invention is not limited to these examples.

Temperatures are given in ° C., and parts and percentages are on a weight basis.

The examples were carried out in equipment of the type shown in FIGURE 1.

EXAMPLE I

This example involved the use of cresylic acid having a boiling range of from about 200° to 230° consisting principally of xylenols.

Part 1

582 parts of cresylic acid having less than 0.1% moisture were charged into a reactor. 14.9 parts of aluminum chloride were added thereto. 233 parts of phosphorus oxychloride were then charged over a period of about one hour into the mixture while maintaining the temperature at 90° to 100°; the mixture was first heated to 90° and the phosphorus oxychloride charged at a rate to maintain the temperature below 100°. Thereafter the reaction mixture was heated to 140° and held at 140° to 150° for four hours, at the end of which time the reaction was complete. The reaction product was then distilled under a vacuum of from 4 to 6 mm. of mercury and at an initial still pot temperature of about 170° to a final temperature of 285°. A first cut consisting of 30 parts was taken off at still pot temperatures of from about 170° to 250°. An intermediate cut consisting of 18 parts was taken off at still pot temperatures of from 250° to 270°. 411 parts of product were taken off at still pot temperatures of from 270° to 285°. 195 parts were left in the still as residue.

Part 2

Instead of the 14.9 parts of aluminum chloride used in part 1, 192.5 parts of the residue produced in part 1 was used as the catalyst. Otherwise the conditions were the same as in part 1 up to the distillation of the reaction product; the ratio of cresylic acid to phosphorus oxychloride was identical in both parts of this example. In part 2 of this example the reaction product was distilled under a vacuum of from 4 to 6 mm. of mercury and at an initial still pot temperature of about 170° to a final temperature of 285°. A first cut consisting of 40 parts was taken off at still pot temperatures of from about 170° to 250°. An intermediate cut consisting of 27 parts was taken off at still pot temperatures of from 250° to 270°. 571 parts of product were taken off at still pot temperatures of from 270° to 285°. 199 parts were left as residue in the still.

Parts 3, 4, 5 and 6

The above described part 2 procedure was repeated, recycling the residue four more times. The conditions in each repetition were substantially the same as noted above in part 2 of this example, there being a small difference in the amount of residue recovered and recycled, which difference is inherent in any distillation of materials such as the reaction product under consideration. As a practical matter is is not possible when distilling such materials to duplicate exactly the fractionation from one run to the next. The amount of residue recovered in parts 3, 4, 5 and 6 were respectively 199, 205, 213 and 210 parts.

The percentage yields, based on phosphorus oxychloride, obtained in all six parts of this example are given in Table I which follows:

TABLE I

| | Yield Percent |
|---|---|
| Part 1 | 96.0 |
| Part 2 (1st recycle) | 98.5 |
| Part 3 (2nd recycle) | 99.0 |
| Part 4 (3rd recycle) | 99.0 |
| Part 5 (4th recycle) | 99.0 |
| Part 6 (5th recycle) | 99.0 |

EXAMPLE II

This example involved the use of phenol.

Part 1

455 parts of phenol containing less than 0.1% moisture and 14 parts of magnesium chloride were mixed and heated to 90°. 230 parts of phosphorus oxychloride were added to the mixture over a period of 1½ hours while maintaining the temperature at 80° to 90°. Thereafter the reaction mixture was heated to 140° to 150° for 6 hours, at the end of which time reaction was complete.

The reaction product was then distilled under a vacuum of from 4 to 5 mm. of mercury and at an initial still pot temperature of about 155° to a final temperature of 265°. A first cut consisting of 22 parts was taken off at still pot temperatures of from about 155° to 215°. An intermediate cut consisting of 20 parts was taken off at still pot temperatures of 215° to 245°. 327 parts of product were taken off at still pot temperatures of 245° to 265°. 172 parts of distillation residue remained containing about 41 parts of magnesium chloride phenol complex.

Part 2

Instead of the 14 parts of magnesium chloride used in part 1, 170 parts of the distillation residue remaining in part 1 were used as the catalyst. Otherwise the conditions were the same as in part 1 up to the distillation of the reaction product; the ratio of phenol to phosphorus oxychloride was identical in both parts of this example. In part 2 of this example the reaction product was distilled under a vacuum of from 4 to 5 mm. of mercury and at an initial still pot temperature of about 155° to a final temperature of 265°. A first cut consisting of 25 parts was taken off at still pot temperatures of from about 155° to 215°. An intermediate cut consisting of 15 parts was taken off at still pot temperatures of from 215° to 245° and 481 parts of product were taken off at still pot temperatures of 245° to 265°. 177 parts of distillation residue remained.

The yield of triphenyl phosphate based on the phosphorus oxychloride in part 1 was 94%; in part 2, the yield was 97%.

EXAMPLE III

This example involved the use of cresylic acid containing 77% meta and para cresols and 20% 2,4-xylenol and 2,5-xylenol.

Part 1

545 parts of the cresylic acid containing less than 0.1% moisture, 2 parts of magnesium turnings (containing 99.8% magnesium) and 60 parts of phosphorus oxychloride were mixed. The mixture was heated to 90° when hydrogen chloride evolution started and held at 95–100° for about 35 minutes, the magnesium being thus completely reacted with the phosphorus oxychloride to form magnesium chloride. 170 parts of phosphorus oxychloride were added during the next 45 minutes while the reaction mixture was maintained at 95–100°. After an additional 30 minutes at this temperature, the reaction mixture was heated to 150° and held at 150–160° for 10 hours. The resultant reaction product was partially distilled under a vacuum of from 2 to 3 mm. of mercury. 90 parts of a forerun consisting chiefly of cresylic acid and containing 17–18 parts of tricresylphosphate were removed; thereafter 332 parts of tricresylphosphate were removed leaving a distillation residue of 191 parts containing from 40 to 50 parts of magnesium chloride cresylic acid complex and the rest, chiefly tricresylphosphate.

Part 2

The residue from part 1 and 545 parts of cresylic acid were heated to 95°. Thereafter 230 parts of phosphorus oxychloride were added over a 50 minute interval while the reaction mixture was maintained at 95–100°. The reaction was then completed as described above in connection with the first batch. During distillation of the second batch, there was taken off overhead under a vacuum of from 2 to 3 mm. of mercury, a first cut of 90 parts consisting of cresylic acid and 17–18 parts of tricresylphosphate, and a second cut of tricresylphosphate in amount of 646 parts, leaving a residue of 53 parts.

The yield of tricresyl phosphate based on the phosphorus oxychloride in the first batch was 84.5%; in the second batch the yield was 92%.

EXAMPLE IV

This example involved the use of cresylic acid containing less than 0.1% moisture and consisting chiefly of about 60% phenol and about 40% mixed cresols.

Part 1

9,200 pounds of the cresylic acid were mixed with 190 pounds of aluminum chloride and 4,400 pounds of phosphorus oxychloride at an initial temperature of 90° and a final temperature of 150°. The initial temperature was maintained for about 5 hours and thereafter the reaction mixture was heated to a maximum temperature of 150° for about four hours. Thereafter the resultant reaction mixture was distilled under a vacuum of from 4 to 6 mm. of mercury to remove at a still pot temperature of from 160° to 250° a first cut containing chiefly unreacted cresylic acid; the first cut amounted to 1,070 pounds. Thereafter tricresyl phosphate in amount of 6,950 pounds was taken off overhead at a still pot temperature of from 250° to 275°. There remained a distillation residue in amount of 2,700 pounds containing about 80% tricresylphosphate in which was dissolved about 20% aluminum chloride cresylic acid complex.

Part 2

7,600 pounds of cresylic acid were charged into the reactor along with 2,700 pounds of the distillation residue from part 1.

This mixture was then heated to 90° and 3,630 pounds of phosphorus oxychloride added over a period of 8 hours while maintaining the temperature at 90° to 100°. Thereafter this reaction mixture was heated to 140° to 150° for about 4 hours. It was then distilled at a still pot temperature of from 160° to 250° and under a vacuum of from 4 to 6 mm. of mercury, taking off overhead a first cut in amount of 780 pounds containing chiefly cresylic acid, then the reaction product in the vapor phase which was condensed and redistilled at a still pot temperature of from 255° to 270° and under a vacuum of 4 mm. of mercury to produce a forerun fraction and a product fraction (7,800 pounds). The residue from this redistillation as well as that from the initial distillation of the reaction product were mixed to form a catalyst-containing mixture (2,790 pounds) for recycle to the next batch.

Parts 3, 4, 5 and 6

Parts 3, 4, 5 and 6 involved a repetition of part 2, the mixed residue containing catalyst from a preceding part being used in a succeeding part, i.e. the mixed residue from part 2 was used in part 3, that from part 3 was used in part 4, etc.

The yield of tricresylphosphate thus obtained, based on the amount of phosphorus oxychloride charged, is given in Table II which follows:

TABLE II

|  | Yield percent |
|---|---|
| Part 1 | 92 |
| Part 2 | 97 |
| Part 3 | 98 |
| Part 4 | 97 |
| Part 5 | 96 |
| Part 6 | 99 |

It will be noted that the present invention provides a process of producing triarylphosphates, particularly tricresylphosphates, which process results in higher yields, can be carried out more economically, effects a saving in the cost of the catalyst and eliminates the necessity for obtaining substantially complete product recovery during the distillation of the reaction mixture to recover the product and hence permits the distillation to be carried out with lower end temperatures and this without sacrificing yield of product but on the contrary and surprisingly with an improvement in the yield of product. Moreover, in that the distillation of the reaction mixture can be carried out at lower end temperatures, the present invention reduces still corrosion.

Since different embodiments of the invention could be made without departing from the scope of this invention, it is intended that all matter contained in the above description or shown in the accompanying drawings shall be interpreted as illustrative and not in a limiting sense.

What is claimed is:

1. The method of making tricresylphosphate which comprises reacting phosphorus oxychloride and cresylic acid in the presence of a catalyst complex from the group consisting of the complexes of cresylic acid with (a) aluminum chloride, (b) magnesium chloride, (c) zinc chloride and (d) mixtures of said chlorides, said complex being present in the distillation residue derived from the distillation of the reaction product produced by reacting cresylic acid and phosphorus oxychloride in the presence of a chloride from the group consisting of aluminum chloride, magnesium chloride, zinc chloride and mixtures of said chlorides.

2. The method of making a triarylphosphate which comprises mixing phosphorus oxychloride and a hydroxybenzene selected from the group consisting of phenol, alkyl phenols in which the alkyl groups have from 1 to 4 carbon atoms, mixtures of said phenol with said alkyl phenols, and mixtures of said alkyl phenols, in amount in excess of the stoichiometric amount required to react with the phosphorus oxychloride, said excess not exceeding about 10% by weight, and a catalyst from the group consisting of aluminum chloride, magnesium chloride, zinc chloride and mixtures of said chlorides, in amount of from 1% to 10% based on the weight of the phosphorus oxychloride, reacting said mixture at a temperature not exceeding about 200° C. until substantially all of the phosphorus oxychloride is reacted with said hydroxybenzene, distilling the reaction mixture to drive off unreacted hydroxybenzene and the bulk of the triarylphosphate leaving leaving a distillation residue containing catalyst and a minor proportion of the triarylphosphate formed in the reaction, mixing said distillation residue with said hydroxybenzene and phosphorus oxychloride, heating said mixture to a temperature not exceeding 200° C. until the phosphorus oxychloride is reacted with said hydroxybenzene and distilling the resultant reaction mixture to recover triarylphosphate therefrom.

3. The process as defined in claim 2 carried out as a batch procedure in which the said distillation residue from a preceding batch is recycled to the reaction mixture of a succeeding batch to supply the catalyst for the reaction.

4. The process as defined in claim 2 carried out as a continuous process in which the distillation residue from the distillation of the reaction product is passed continuously into the reaction zone for admixture with the hydroxybenzene and phosphorus oxychloride supplied thereto and to supply the catalyst for the reaction.

5. The method of making a triarylphosphate which comprises mixing phosphorus oxychloride and a hydroxybenzene selected from the group consisting of phenol, alkyl phenols in which the alkyl groups have from 1 to 4 carbon atoms, mixtures of said phenol with said alkyl phenols, and mixtures of said alkyl phenols, in amount in excess of the stoichiometric amount required to react with the phosphorus oxychloride, said excess not exceeding about 10% by weight, and a catalyst from the group consisting of aluminum chloride, magnesium chloride and zinc chloride, and mixtures of said chlorides in amount of from 1% to 10% based on the weight of the phosphorus oxychloride, reacting said mixture at a temperature not exceeding about 200° C. until substantially all of the phosphorus oxychloride is reacted with said hydroxybenzene, distilling the reaction mixture to drive off unreacted hydroxybenzene and the bulk of the triarylphosphate leaving a mobile distillation residue containing catalyst and a minor proportion of the triarylphosphate formed in the reaction, mixing said mobile distillation residue with said hydroxybenzene and phosphorus oxychloride in the proportions of from 1 to 65 parts of said mixture per 100 parts of hydroxybenzene, the amount of said hydroxybenzene being in excess of the stoichiometric amount required for the reaction with the phosphorus oxychloride, said excess not exceeding 10% by weight, heating said mixture to a temperature not exceeding 200° C. until the phosphorus oxychloride is reacted with said hydroxybenzene and distilling the resultant reaction mixture to recover triarylphosphate therefrom.

6. The method of making tricresylphosphate which comprises mixing phosphorus oxychloride and cresylic acid in amount in excess of the stoichiometric amount required to react with the phosphorus oxychloride, said excess not exceeding about 10% by weight, and a catalyst from the group consisting of aluminum chloride, magnesium chloride, zinc chloride and mixtures of said chlorides, in amount of from 1% to 10% based on the weight of the phosphorus oxychloride, reacting said mixture at a temperature of from 140° to 150° C. until substantially all of the phosphorus oxychloride is reacted with said cresylic acid, distilling the reaction mixture to drive off unreacted cresylic acid and the bulk of the triarylphosphate leaving a mobile distillation residue containing catalyst and tricresylphosphate, mixing said distillation residue with said cresylic acid and phosphorus oxychloride in the proportions of from 1 to 65 parts of said mixture per 100 parts of cresylic acid, the amount of said cresylic acid being in excess of the stoichiometric amount required for the reaction, said excess not exceeding 10% by weight, heating said mixture to a temperature of from 140° to 150° C. until the phosphorus oxychloride is reacted with said cresylic acid and distilling the resultant mixture to recover tricresylphosphate therefrom.

7. The method of making a triarylphosphate which comprises mixing phosphorus oxychloride and a hydroxybenzene selected from the group consisting of phenol, alkyl phenols in which the alkyl groups have from 1 to 4 carbon atoms, mixtures of said phenol with said alkyl phenols, and mixtures of said alkyl phenols, in amount in excess of the stoichiometric amount required to react with the phosphorus oxychloride, said excess not exceeding about 10% by weight, and aluminum chloride in amount of about 5% based on the weight of the phosphorus oxychloride, reacting said mixture initially at a temperature of from about 40° to 120° C. and thereafter at a temperature of from 120° to 160° C. until substantially all of the phosphorus oxychloride is reacted with said hydroxybenzene, distilling the reaction mixture to drive off unreacted hydroxybenzene and the bulk of the triarylphosphate leaving a distillation residue containing an aluminum chloride—hydroxybenzene complex dissolved in triarylphosphate, mixing said distillation residue with said hydroxybenzene and phosphorus oxychloride in the proportions of from 1 to 65 parts of said mixture per 100 parts of hydroxybenzene, the amount of said hydroxybenzene being in excess of the stoichiometric amount required for the reaction, said excess not exceeding 10% by weight, heating said mixture initially to a temperature of from 40° to 120° C. and thereafter to a temperature of from 120° to 160° C. until the phosphorus oxychloride is reacted with said hydroxybenzene, distilling the resultant reaction mixture to recover triarylphosphate therefrom, and repeating the recycle of the distillation residue to supply the catalyst required for reacting additional quantities.

8. The method of making a triarylphosphate which comprises mixing phosphorus oxychloride and a hydroxybenzene selected from the group consisting of phenol, alkyl phenols in which the alkyl groups have from 1 to 4 carbon atoms, mixtures of said phenol with said alkyl phenols, and mixtures of said alkyl phenols, in amount in excess of the stoichiometric amount required to react with the phosphorus oxychloride, said excess not exceeding about 10% by weight, and an aluminum chloride catalyst in amount of about 5% based on the weight of the phosphorus oxychloride, reacting said mixture initially at a temperature of from about 40° to 130° C. and thereafter at a temperature of from 140° to 150° C. until substantially all of the phosphorus oxychloride is reacted with said hydroxybenzene, distilling the reaction mixture to drive off unreacted hydroxybenzene and the bulk of the triarylphosphate leaving a distillation residue containing an aluminum chloride—hydroxybenzene complex dissolved in triarylphosphate, mixing said distillation residue with said hydroxybenzene and phosphorus oxychloride in the proportions of from 1 to 65 parts of said mixture per 100 parts of hydroxybenzene, the amount of said hydroxybenzene being in excess of the stoichiometric amount required for the reaction, said excess not exceeding 10% by weight, heating said mixture initially to a temperature of from 40° to 130° C. and thereafter to a temperature of from 140° to 150° C. until the phosphorus oxychloride is reacted with said hydroxybenzene, and distilling the resultant reaction mixture to recover triarylphosphate therefrom.

9. The method of making tricresylphosphate which comprises mixing phosphorus oxychloride and cresylic acid in amount in excess of the stoichiometric amount required to react with the phosphorus oxychloride, said excess not exceeding about 10% by weight, and aluminum chloride in amount of about 5% based on the weight of the phosphorus oxychloride, reacting said mixture initially at a temperature of about 90° C. and thereafter at a temperature of from 140° to 150° C. until substantially all of the phosphorus oxychloride is reacted with said cresylic acid, distilling the reaction mixture to drive off unreacted cresylic acid and the bulk of the tricresylphosphate leaving a distillation residue containing an aluminum chloride—cresylic acid complex dissolved in tricresylphosphate, said residue containing about 80% tricresylphosphate, mixing said distillation residue with said cresylic acid and phosphorus oxychloride in the proportions of about 30 to 35 parts of said residue per 100 parts of said cresylic acid, the amount of cresylic acid being in excess over the stoichiometric amount of cresylic acid required for the reaction with the phosphorus oxychloride, said excess not exceeding about 10% by weight, heating said mixture initially to a temperature of about 90° C. and thereafter to a temperature of from 140° to 150° C. until the phosphorus oxychloride is reacted with said cresylic acid and distilling the resultant mixture to recover tricresylphosphate therefrom.

10. The method of making a triarylphosphate which comprises reacting phosphorus oxychloride and a hydroxybenzene selected from the group consisting of phenol, alkyl phenols in which the alkyl groups have from 1 to 4 carbon atoms, mixtures of said phenol with said alkyl phenols, and mixtures of said alkyl phenols, in the presence of a distillation residue remaining after distilling the reaction product derived from a reaction mixture containing said hydroxybenzene, phosphorus oxychloride and a catalyst for the reaction between said hydroxybenzene and phosphorus oxychloride selected from the group consisting of aluminum chloride, magnesium chloride, zinc chloride and mixtures of said chlorides.

11. The method of making a triarylphosphate which comprises reacting phosphorus oxychloride and a hydroxybenzene selected from the group consisting of phenol, alkyl phenols in which the alkyl groups have from 1 to 4 carbon atoms, mixtures of said phenol with said alkyl phenols, and mixtures of said alkyl phenols, in the presence of a catalyst selected from the group consisting of aluminum chloride, magnesium chloride, zinc chloride and mixtures of said chlorides, distilling the reaction mixture at a still pot temperature of from 220° to 300° C. to drive off unreacted hydroxybenzene and the bulk of the triarylphosphate overhead, mixing the distillation residue from said distillation with said hydroxybenzene and phosphorus oxychloride and thus utilizing said distillation residue to catalyze the reaction between said hydroxybenzene and phosphorus oxychloride to produce additional quantities of said triarylphosphate.

References Cited in the file of this patent

UNITED STATES PATENTS

| 1,858,659 | Britton | May 17, 1932 |
| 2,198,595 | Amos et al. | Apr. 30, 1940 |
| 2,684,888 | Pryde | July 27, 1954 |
| 2,870,192 | Bonstedt | Jan. 20, 1959 |

OTHER REFERENCES

Thomas: Anhydrous Aluminum Chloride in Organic Chemistry, pages 10, 40 and 52 (1941 edition), Reinhold Publishing Co., New York, N.Y. A.C.S. Monograph No. 87.